United States Patent Office 3,187,135
Patented June 1, 1965

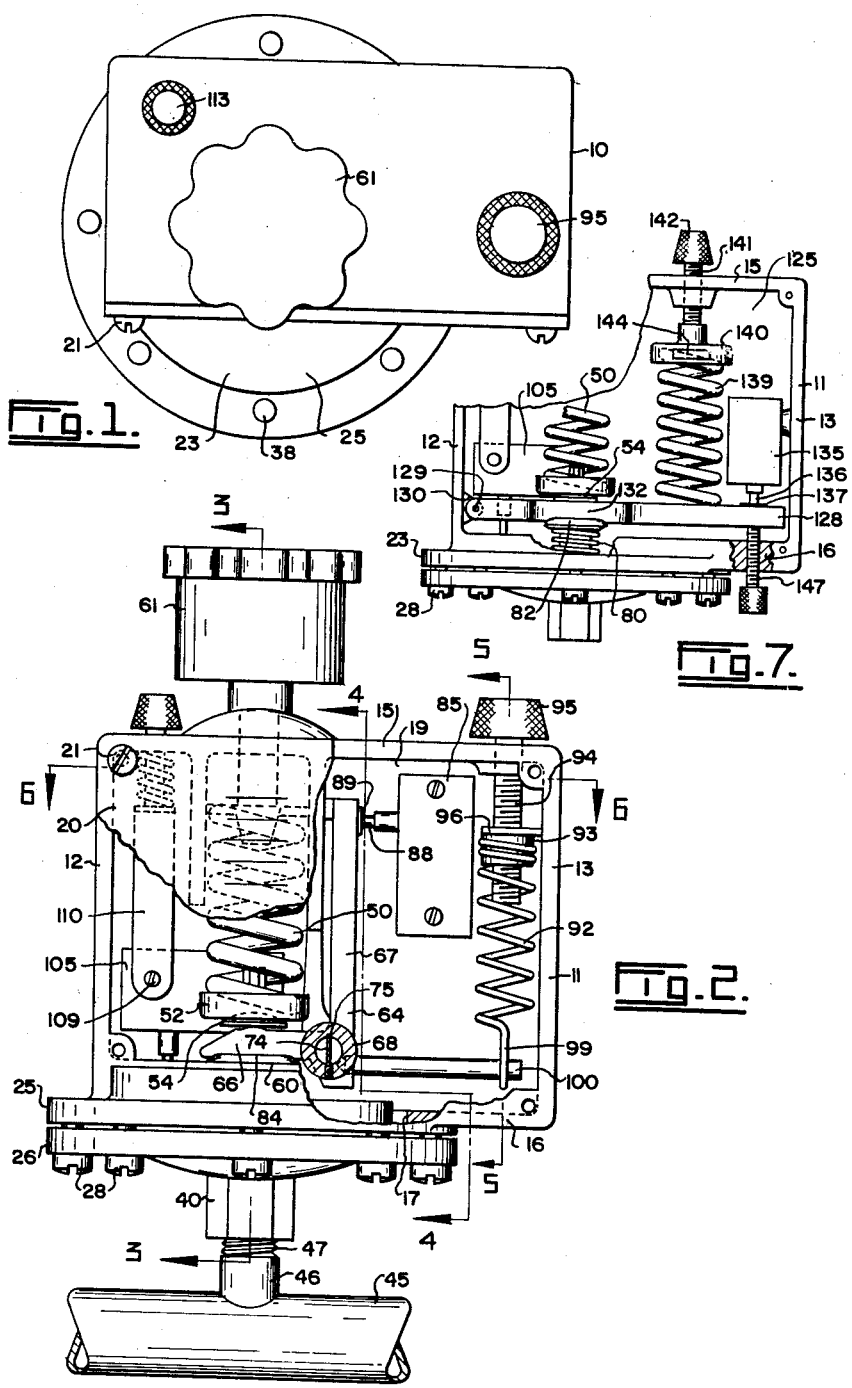

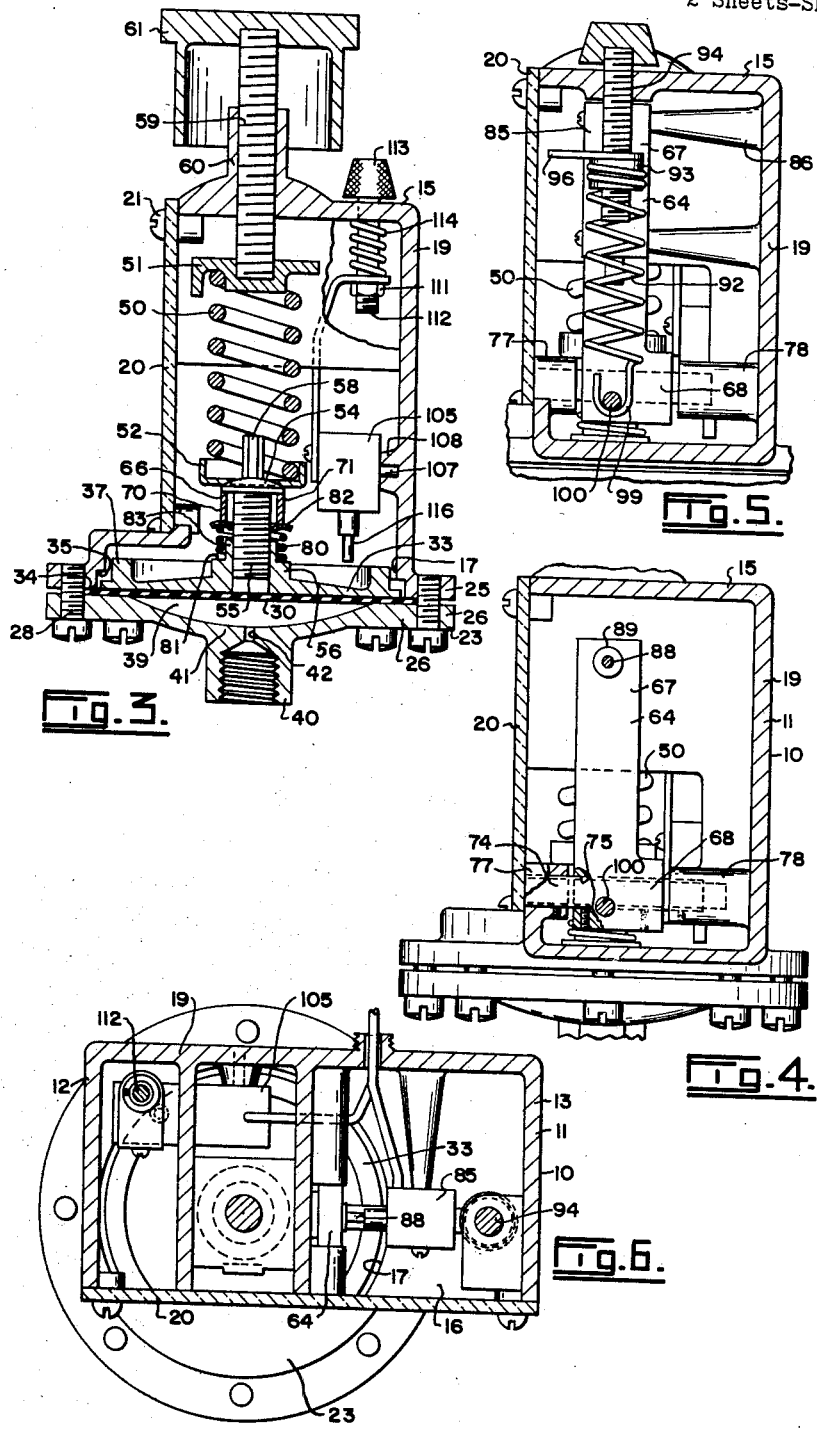

3,187,135
PRESSURE OPERATED PRESSURE
REGULATING SWITCH
Ernst Singer, 3491 Puget Drive, Vancouver,
British Columbia, Canada
Filed Jan. 26, 1960, Ser. No. 4,776
10 Claims. (Cl. 200—83)

This invention relates to a pressure operated switch for controlling an electrical circuit, that is, for opening or closing said circuit.

An object of the present invention is the provision of a pressure operated switch for controlling an electrical circuit under predetermined conditions.

The present switch is such that it may be used for many different purposes. It is operated by pressure to control an electrical circuit which is intended to set something into operation which is required as a result of an increase or decrease in the pressure which operated the switch. The pressure may be against a diaphragm, piston or bellows, such as when this device is connected to a pressure line. The switch operates the circuit when the pressure in the line reaches a predetermined point, said circuit controlling whatever is necessary to vary the line pressure, and the circuit control remains until the line pressure has dropped to another predetermined point. The pressure may be in a bellows due to temperature changes, such as when the device is used as a temperature controller; or it may be the pressure of a liquid in a level-controlling set up.

Another object is the provision of a pressure operated switch of very simple construction and which is very positive and accurate in action.

A pressure operated switch according to the present invention comprises a pressure element adapted to be moved by pressure to which it is exposed during use, pressure means opposing the movement of the element, a pivotally mounted lever near the pressure element, resiliently compressible means between the lever and the pressure element and opposing the movement of said element, said compressible means being weaker than the pressure means, and a plunger-operated switch for controlling an electric circuit and positioned to have its plunger moved by the lever when the latter is moved by the pressure element through the compressible means to operate the switch, said switch requiring a certain operating force and having a smaller return force. The preferred form of the invention includes a bias spring connected to the lever and opposing the action of the compressible means, and adjusting means connected to the bias spring for adjusting the opposition thereof to the compressible means from nil up to a predetermined value.

Referring to the drawings,

FIGURE 1 is a plan view of a preferred form of pressure operated switch,

FIGURE 2 is a side elevation of this switch with parts of the cover thereof broken away to disclose the interior, FIGURE 3 is a vertical section taken on the line 3—3 of FIGURE 2, FIGURE 4 is a vertical section taken on the line 4—4 of FIGURE 2, FIGURE 5 is a vertical section taken on the line 5—5 of FIGURE 2, FIGURE 6 is a horizontal section taken on the line 6—6 of FIGURE 2, and FIGURE 7 is a view similar to FIGURE 2 illustrating an alternative form of pressure operated switch, Referring to FIGURES 1 to 6 of the drawings, 10 is a preferred form of pressure operated switch including a casing 11 of any desired construction. The illustrated casing has end walls 12 and 13, a top 15 and small bottom 16 with a relatively large opening 17 therein, a back wall 19, and a front wall 20, the latter being removably held in place in any desired manner, such as by means of screws 21.

In this form of the invention the pressure element is a diaphragm, but it is to be understood that said element may be a piston or bellows. A diaphragm unit 23 is connected to casing 11 at the bottom opening 17 thereof in any convenient manner. In this example, unit 23 consists of a top 25 and a bottom 26, said top and bottom being generally circular in shape, and the bottom being connected to the top in any suitable manner, such as by bolts 28 positioned near the peripheries thereof. A diaphragm 30 is clamped between top 25 and bottom 26 of unit 23 within bolts 28, as clearly shown in FIGURE 3. This diaphragm is formed of rubber or other suitable material. In this example, unit top 25 is integrally formed with casing 11 at the bottom thereof so that it surrounds the bottom opening 17 or, in other words, the interior of the casing communicates with the interior of unit 23 above diaphragm 30 thereof through opening 17. A backing plate 33 rests against the upper surface of diaphragm 30 and slidably fits against or preferably just clears an interior annular wall 34 of unit 23. A shoulder 35 is formed in top 25 at the upper edge of wall 34, said shoulder extending over but being spaced from the upper surface of backing plate 33 when diaphragm 30 is in its neutral or non-extended position. Backing plate 33 may have an upwardly-extending annular flange 37 on its upper surface spaced inwardly from the diaphragm unit inner wall 34.

Bottom 26 of unit 23 is so formed to provide an inlet chamber 39 within the unit beneath diaphragm 30. An internally-threaded boss 40 is formed with and projects downwardly from bottom 26 centrally thereof. The inner end of boss 40 preferably is closed off from chamber 39 by a wall 41, excepting for a small orifice 42 in said wall.

Diaphragm 30 forms the pressure element of pressure operated switch 10. FIGURE 2 illustrates one use of this switch device. A pipe 45 containing a fluid under pressure is connected by a small pipe 46 to boss 40, pipe 46 having a threaded end 47 which is threaded into said boss. With this arrangement, the pressure of pipe 45 is applied to the under surface of diaphragm 30. The orifice 42 protects the diaphragm from sudden surges in pipe 45 or, in other words, it is an anti-surge orifice.

Pressure means is provided in casing 11 to oppose the movement of the pressure element or diaphragm 30. In this example, the pressure means is in the form of a main spring 50 extending between upper and lower cup-like seats 51 and 52. The lower seat rests on a dome-shaped washer 54 which, in turn, sits on the upper end of a threaded stem 55 which is threaded into a boss 56 projecting from the upper surface of backing plate 33. Stem 55 has a reduced portion 58 extending upwardly from its upper end through washer 54 and seat 52 into spring 50. The pressure of spring 50 may be adjusted by a screw 59 threaded through an upwardly-projecting boss 60 formed on the top 15 of casing 11. A knob 61 is provided on the outer end of screw 59.

A pivotally mounted lever is provided near the pressure element or diaphragm 30 within casing 11. In this form of the invention, a bell crank lever 64 is provided in casing 11. This lever includes a lower arm 66 and an upper arm 67 joined together at a heel 68. Lower arm 66 is near and substantially parallel with diaphragm 30, and said arm is bifurcated to form side members 70 and 71 extending on opposite sides of stem 55 and beneath washer 54, as clearly shown in FIGURES 2 and 3. Lever 64 is pivotally mounted in casing 11 at the junction of arms 66 and 67 where heel 68 is formed. The lever may be mounted on a pivot pin, but it preferably is mounted on a flat spring 74 which fits in a slot 75 extending through heel 68, the ends of said spring being anchored in aligned bosses 77 and 78 carried by housing 11 on opposite sides of lever 64. The lever is actually fixed to and supported by spring 74 so that any pivoting of the bell crank lever results in a twisting of said spring. Actually, the pivotal movement of the lever is very small.

Compressible means is provided between lever 64 and pressure element or diaphragm 30. This compressible means is in the form of a light balancing spring 80 which extends between a shoulder 81 formed on the backing plate boss 56 and a washer 82. The side members 70 and 71 of the lever lower arm 66 rest on this washer 82 so that normally said side members bear against the latter washer and washer 54. It is preferable to use spring 80 as centering means for backing plate 33 so that the periphery of the latter may be clear of wall 34 in unit 23. For this purpose, the lower end of spring 80 fits over a reduced portion 83 of boss 56, while the upper end of said spring and washer 82 fit into notches 84 in the lower edges of side members 70 and 71 of lever arm 66.

A snap action switch 85 is carried by an arm 86 fixed to and projecting inwardly from the back wall 19 of casing 11. This switch is aligned with and spaced from the upper end of lever upper arm 67. This switch has an operating plunger 88 projecting therefrom and engaging arm 67, see FIGURE 2. It is preferable to interpose a rubber cushion 89 between arm 67 and the end of the plunger, said cushion being secured to the arm. Switch 85 is the type that requires a certain operating or switching force against plunger 88 to cause it to operate, and has a smaller release or return force. In other words, the switch includes spring means for resisting the inwardly movement of plunger 88 and which after the switch has operated exerts less force to return the plunger to its normal position. These switches are well known in the trade, and switches may be obtained requiring different operating or switching forces.

Crank lever 64 is adjusted to its proper position by turning stem 55 in the backing plate boss 56 in either direction to cause the upper end of arm 67 to engage switch plunger 88 without moving said plunger. This is done with diaphragm 30 at its zero position.

A bias spring 92 preferably is provided in casing 11. In this example, the bias spring is connected to and hangs downwardly from a nut 93 which is threaded on a screw 94 which, in turn, is threaded through the top 15 of the casing and has a knob 95 on its upper end. If desired, an indicator or indicating arm 96 may be connected to nut 93. This arm extends towards front wall 20 of casing 11 which may be completely formed of transparent material, as indicated in the drawings, or it may have a transparent section opposite said indicating arm. Suitable calibrations, not shown, are placed on the front wall at arm 96 so that the latter indicates the setting of bias spring 92.

The lower end of spring 92 is connected in any suitable manner to lever 64 in such a way as to oppose spring 80. In this example, the lower end of the spring is formed with a U-shaped loop 99 through which a bar 100 extends, said bar being connected to the bell crank lever 64 at the junction of the arms thereof and extending away from the lower arm 66, as clearly shown in FIGURE 2.

It will be noted that main spring 50 opposes the movement of diaphragm 30 under action of the pressure of fluid in pipe line 45. Bias spring 92 and the spring loading of plunger 88 oppose the action of spring 80 when the latter is pushed upwardly by the diaphragm.

Switch 85 is adapted to control an electrical circuit, not shown, either by opening or closing said circuit. If pressure operated switch 10 is intended to keep the pressure in line 45 from rising above a predetermined level, the circuit controlled by switch 85 will operate the circuit thereof to cause suitable apparatus or mechanism to function in order to lower the pressure in pipe 45.

A second snap action switch 105 is mounted in casing 11 near diaphragm 30. It is preferable to be able to adjust the position of switch 105. In this example, a pin 107 projects from one end of switch 105 into a boss 108 formed on the inner surface of the back wall 19 of the casing, see FIGURE 3, while the opposite end of said switch is pivotally connected at 109 to the lower end of an arm 110, the upper end of which is bent and extends over a nut 111 threaded on a screw 112 which is threaded through the top 15 of the casing and has a knob 113 on its outer end. A spring 114 extends between the end of arm 110 and the inner surface of top 15.

Switch 105 has a downwardly-extending operating plunger 116 with its free end just above flange 37 of backing plate 33, see FIGURE 3. With this arrangement, when the backing plate is moved upwardly a predetermined distance by diaphragm 30, it operates switch 105. This switch controls an electrical circuit which also controls the mechanism or apparatus which is intended to reduce the pressure in pipe 45. In other words, switch 105 is a safety switch so that if anything happens to switch 85 and it does not operate when it should at the time the pressure in pipe 45 reaches the level for which the switch 10 is set, a further increase in the pipe pressure will cause switch 105 to be operated to do the necessary job. Switch 105 is operated before backing plate 33 moves high enough to engage shoulder 35 in the top 25 of diaphragm unit 23. Therefore, should both switches fail and the pressure in pipe 45 continue to rise, the backing plate will engage shoulder 35 before the various elements of switch 10 are damaged by the excessive pressure.

The operation of switch 10 is very simple. The pressure of main spring 50 is adjusted by turning knob 61 in order to set the pressure at which the switch should operate, say, for example, 50 pounds. The tension of bias spring 92 is adjusted to select a desired differential within a differential range permitted by the spring of main spring 50. Thus, as the pressure in pipe 45 and, consequently, against diaphragm 30, approaches the set level, the diaphragm is moved upwardly against the pressure of spring 50, said movement being transferred against the spring through stem 55. As the force of bias spring 92 and the spring of switch plunger 88 oppose the upward movement of the diaphragm, the bell crank lever 64 will not move until the comparatively weak spring 80 is compressed sufficiently to overcome the force of the bias and plunger springs. Until this time, washer 54 is lifted off the side members 70 and 71 of the lower arm 66 of the lever. Continued movement of the diaphragm causes lever 64 to pivot and depress plunger 88 until switch 85 is operated. This action operates the circuit controlled by switch 85 to cause the necessary apparatus to function to change the pressure in pipe 45. The pivoting action of lever 64 was opposed by the bias and plunger springs. However, the spring means of switch 85 is such that once the switch is operated, a smaller release or return force is exerted on the plunger than was necessary to depress it. Therefore, during the first part of the downward movement of diaphragm 30, spring 80 will expand until the force of bias spring 92 and the return spring pressure against plunger 88 is sufficient to overcome the pressure of spring 80, at which time lever 64 will pivot in the opposite direction. Usually, washer 54 under the influence of main spring 50 engages the bifurcated arm 66 of the lever in order to return the latter to its normal position. With this arrangement, the pressure in line 45 changes to a predetermined point before the pressure-changing apparatus is put out of action as a result of the plunger 88 of switch 85 returning to its normal position.

As stated above, a main spring 50 of a given strength provides a certain pressure differential range. The differential pressure is increased within this range by increasing the tension of bias spring 92, and decreased by reducing the tension of said spring. The spring is arranged so that it may be adjusted to a point where it does not exert any influence on bar 100 and, consequently, lever 64 when they are in their normal positions. At this time, the minimum pressure differential only is obtainable.

FIGURE 7 illustrates an alternative form of pressure switch 125. This device includes the same casing 11, diaphragm unit 23 and main spring 50. The main difference from switch 10 is that bell crank lever 64 is omitted, and another lever 128 is substituted therefor. Lever 128 is pivotally mounted at one end on a pin 129 carried by a lug 130 extending inwardly from end wall 12 of the casing. Lever 128 is near and extends substantially parallel with diaphragm 30. The lever is formed with outwardly-curved side members 132 that extend on opposite sides of stem 55 in the manner as the side members 70 and 71 of lever arm 66 in switch 10. Side members 132 lie between washers 54 and 82.

A snap action switch 135 is carried by casing end wall 13 and has an operating plunger 136 extending downwardly and engaging lever 128 near the free end thereof. It is preferable to provide a resilient cushion 137 secured to lever 128 and against which the outer end of plunger 136 bears. A bias spring 139 preferably extends from lever 128 near switch 135 upwardly to a seat 140 carried by the lower end of a screw 141 which is threaded through the top 15 of the casing and has a knob 142 on its upper end. If desired, an indicating arm 144 may be secured to seat 140, said arm extending to the front wall 20 of the casing in the same manner as arm 96 of switch 10. Arm 144 will extend to calibrations, not shown, on the casing front wall. It is preferable to provide a set screw 147 threaded through casing bottom 16 and engaging lever 128 to limit the downward movement thereof. This prevents plunger 136 and/or bias spring 139 from depressing spring 80 beyond a desired point through lever 128.

Switch 125 may also include the safety switch 105.

The pressure operated switch 125 operates in the same manner as switch 10, the only difference being that bias spring 139 is under compression when in operation instead of being under tension as is the case with spring 92 in switch 10.

It is obvious that the bias spring may be omitted from either form of the invention. In this case, there would be a fixed differential, and this would depend upon the spring action of switch 85 or 135. In this case, switches having desired spring actions would be selected for the pressure operated switch.

What I claim my invention is:

1. In a pressure operated switch, a pressure element adapted to be moved by pressure to which it is exposed during use, pressure means opposing the movement of the element, a pivotally mounted lever near the pressure element so as to be swung around its pivotal mounting by said element, resiliently compressible means extending from the lever to the pressure element and opposing the movement of said element, said compressible means being weaker than the pressure means, a plunger-operated switch for controlling an electric circuit and positioned to have its plunger moved by the lever when the latter is moved by the pressure element through the compressible means, said switch requiring a certain operating force and having a smaller return force, said lever operating the switch when the force of the compressible means equals said switch operating force, and said switch remaining operated until the force of the compressible means is reduced by movement of the lever below the switch return force, and a second switch mounted near the pressure element and positioned to be operated thereby after a predetermined movement thereof by the pressure.

2. In a pressure operated switch, a pressure element adapted to be moved by pressure to which it is exposed during use, pressure means opposing the movement of the element, a pivotally mounted lever near the pressure element so as to be swung around its pivotal mounting by said element, resiliently compressible means extending from the lever to the pressure element and opposing the movement of said element, said compressible means being weaker than the pressure means, a bias spring connected to the lever and opposing the action of the compressible means, adjusting means connected to the bias spring for adjusting the opposition thereof to the compressible means from nil up to a predetermined value and a plunger-operated switch for controlling an electric circuit and positioned to have its plunger moved by the lever when the latter is moved by the pressure element through the compressible means, said switch requiring a certain operating force and having a smaller return force, said lever operating the switch when the force of the compressible means equals said switch operating force and the force of the bias spring, and said switch remaining operated until the force of the compressible means is reduced by movement of the lever below said return and bias spring forces.

3. In a pressure operated switch, a pressure element adapted to be moved by pressure to which it is exposed during use, a main spring opposing movement of the element, a pivotally mounted lever near the pressure element so as to be swung around its pivotal mounting by said element, spring means extending from the lever to the pressure element and opposing the movement of said element, said spring means being weaker than the main spring, a bias spring connected to the lever and opposing the action of the spring means, adjusting means connected to the bias spring for adjusting the opposition thereof to the spring means from nil up to a predetermined level, and a plunger-operated switch for controlling an electric circuit and positioned to have its plunger moved by the lever when the latter is moved by the pressure element through the spring means, said switch requiring a certain operating force and having a smaller return force, said lever operating the switch when the force of the spring means equals said switch operating force and the force of the bias spring, and said switch remaining operated until the force of the spring means is reduced by movement of the lever below said return and bias spring forces.

4. In a pressure operated switch, a pressure element adapted to be moved by pressure to which it is exposed during use, a main spring opposing movement of the element, a bell crank lever having a lower arm positioned to be moved by the pressure element and an upper arm connected to said lower arm, said crank lever being pivotally mounted at the junction of the arms thereof, spring means extending from the lower arm to the pressure element and opposing the movement of said element, said spring means being weaker than the main spring, a bar connected to the bell crank lever at the junction of its arms and extending away from the lower arm, a bias spring connected to the bar and through said bar to the crank lever and opposing the action of the spring means, adjusting means connected to the bias spring for adjusting the opposition thereof to the spring means from nil up to a predetermined level, and a plunger-operated switch for controlling an electric circuit and positioned to have its plunger moved by the upper arm when the bell crank lever is moved by the pressure element through the spring means, said switch requiring a certain operating force and having a smaller return force, said lever operating the switch when the force of the spring means equals said switch operating force and the force of the bias spring, and said switch remaining operated until the force of the spring means is reduced by movement of the lever below said return and bias spring forces.

5. A pressure operated switch as claimed in claim 4 in which the bias spring is in tension when opposing the action of the spring means.

6. In a pressure operated switch, a pressure element adapted to be moved by pressure to which it is exposed during use, a main spring opposing movement of the element, a lever pivotally mounted near one end to one side of the pressure element and extending past and beyond the latter to a free end and positioned to be swung around its pivotal mounting by said element, spring means extending from the lever to the pressure element and opposing the movement of said element, said spring means being weaker than the main spring, a bias spring connected to the lever near the free end thereof and opposing the action of the spring means, adjusting means connected to the bias spring for adjusting the opposition thereof to the spring means from nil up to a predetermined level, and a plunger-operated switch for controlling an electric circuit and positioned to have its plunger moved by the free end of the lever when said lever is moved by the pressure element through the spring means, said switch requiring a certain operating force and having a smaller return force, said lever operating the switch when the force of the spring means equals said switch operating force and the force of the bias spring, and said switch remaining operated until the force of the spring means is reduced by movement of the lever below said return and bias spring forces.

7. A pressure operated switch as claimed in claim 6 in which the bias spring is in compression when opposing the action of the spring means.

8. A pressure operated switch as claimed in claim 6 including a set screw normally engaging the lever to limit the movement thereof under action of the bias spring.

9. In a pressure operated switch, a pressure element adapted to be moved by pressure to which it is exposed during use, a main spring opposing movement of the element, a bell crank lever having a lower arm positioned to be moved by the pressure element and an upper arm connected to said lower arm, a flat spring extending through and connected to the lever at the junction of the upper and lower arms thereof, means anchoring the ends of the flat spring outside the lever, spring means extending from the lower arm to the pressure element and opposing the movement of said element, said spring means being weaker than the main spring, a bar connected to the bell crank lever at the junction of its arms and extending away from the lower arm, a bias spring connected to the bar and through said bar to the crank lever and opposing the action of the spring means, and a plunger-operated switch for controlling an electric circuit and positioned to have its plunger moved by the upper arm when the bell crank lever is moved by the pressure element through the spring means, said switch requiring a certain operating force and having a smaller return force, said lever operating the switch when the force of the spring means equals said switch operating force and the force of the bias spring, and said switch remaining operated until the force of the spring means is reduced by movement of the lever below said return and bias spring forces.

10. In a pressure operated switch, a diaphragm adapted to be moved by pressure to which it is exposed during use, a backing plate against a surface of the diaphragm, a lever pivotally mounted near the diaphragm and backing plate, a balancing spring connected to the backing plate and the lever positioning said plate and opposing the movement of the diaphragm, a main spring normally pressing against the lever opposing and stronger than the balancing spring and opposing the movement of the diaphragm, and a plunger-operated switch for controlling an electric circuit and positioned to have its plunger moved by the lever when the latter is moved by the diaphragm through the balancing spring, said switch requiring a certain operating force and having a smaller return force, said lever operating the switch when the force of the balancing spring equals said switch operating force, and said switch remaining operated until the force of the balancing spring is reduced by movement of the lever below the switch return force.

References Cited by the Examiner
UNITED STATES PATENTS

| | | | |
|---|---|---|---|
| 1,494,650 | 5/27 | Twardowsky | 200—83 |
| 2,078,441 | 4/37 | Carlson | 200—83 |
| 2,355,872 | 8/44 | Kronmiller | 200—83 |
| 2,773,147 | 12/56 | Judson | 200—83 |
| 3,005,887 | 10/61 | Robson | 200—83 |

BERNARD A. GILHEANY, *Primary Examiner.*

MAX L. LEVY, WALTER STOLWEIN, *Examiners.*